United States Patent [19]

Kraus

[11] 3,895,356

[45] July 15, 1975

[54] AUTOMATIC DIGITAL HEIGHT GAUGE

[75] Inventor: Ronald G. Kraus, Akron, Ohio

[73] Assignee: Kraus Instruments, Inc., Stow, Ohio

[22] Filed: Oct. 10, 1973

[21] Appl. No.: 405,158

[52] U.S. Cl..... 340/172.5; 235/92 DN; 235/151.32; 33/172 E
[51] Int. Cl..... G06f 15/02; G06f 15/20; G01b 7/02
[58] Field of Search....... 235/151.32, 151.3, 92 DN, 235/151; 33/172 E, 125 C, 125 A; 340/172.5; 73/432 L

[56] References Cited
UNITED STATES PATENTS

| | | | |
|---|---|---|---|
| 3,267,437 | 8/1966 | Harwood | 340/172.5 |
| 3,308,443 | 3/1967 | Couleur | 340/172.5 |
| 3,376,411 | 4/1968 | Montani | 235/151.32 |
| 3,551,649 | 12/1970 | Weber | 235/92 |
| 3,593,298 | 7/1971 | Armstrong | 340/172.5 |
| 3,611,309 | 10/1971 | Zingg | 340/172.5 |
| 3,714,393 | 1/1973 | Johnson | 235/92 DN |
| 3,760,167 | 9/1973 | Schrimshaw | 235/151 |

*Primary Examiner*—Gareth D. Shaw
*Assistant Examiner*—James D. Thomas
*Attorney, Agent, or Firm*—Oldham & Oldham

[57] ABSTRACT

Disclosed is a digital height gauge measuring system wherein an inductosyn type scale and slider assembly is interconnected with a counter and display unit, all of which are interfaced to a programmable calculator. The interface circuitry provides means for transferring data from the gauging system to the calculator wherein the data is processed according to a predetermined program. Automatic determinations of diameters, heights, depths, centerlines, and relative positional relationships may be readily achieved depending upon the particular program utilized with the calculator.

9 Claims, 3 Drawing Figures

3,895,356 ature of the instant invention to present a digital height gauge which has associated therewith a digital display unit providing a visual readout of the positional relationship of the height gauge probe tip with respect to a selectable reference level.

AUTOMATIC DIGITAL HEIGHT GAUGE

BACKGROUND OF THE INVENTION

Heretofore various types of height gauges have been known and utilized in industry. Most known systems are of such nature as to require the user to preform numerous recordations and calculations to achieve the desired measurements. There are no known systems which allow the operator to make such recordations and calculations by merely actuating switches conveniently located near the height gauge probe so as to allow the operator to perform his functions without having to leave the gauge assembly and without having to manually perform the calculations.

Consequently, it is an object of the instant invention to present a digital height gauge which has associated therewith a digital display unit providing a visual readout of the positional relationship of the height gauge probe tip with respect to a selectable reference level.

Another object of the invention is to provide such a digital height gauge wherein a digital display unit is interfaced with a programmable calculator or mini computer which is capable of receiving the digital outputs of the display unit and performing various calculations therewith.

Yet another object of the invention is to present such a digital height gauge wherein a paper tape print out is produced by the programmable calculator so as to present a permanent record of the measurements made.

Still another object of the invention is to present a digital height gauge interfaced with a programmable calculator which utilizes an auto-fire zero-radius probe which automatically actuates the calculator to perform the desired function when the probe comes into contact with a surface to be measured.

Yet a further object of the invention is to provide a digital height gauge assembly which is programmable to perform any of numerous recordations and calculations, the same being under the control of the operator by the mere selection of actuatable switches positioned upon the gauge itself.

These objects and other objects which will become apparent as the detailed description proceeds are achieved by a digital height gauge for measuring, calculating, and recording the measurements between various points on an object to be gauged, comprising: probe assembly means for making contact with the various points and producing signals indicative of the positional relationships therebetween; conversion means connected to the probe assembly means for receiving and converting the signals into binary signals; calculator means for performing preprogrammed operations for determining particular dimensions of the object from the binary signals; and interface means interconnecting the conversion and calculator means for transferring binary data therebetween.

For a complete understanding of the structure and techniques of the invention reference should be had to the following detailed description and accompanying drawings wherein.

Figure 1:
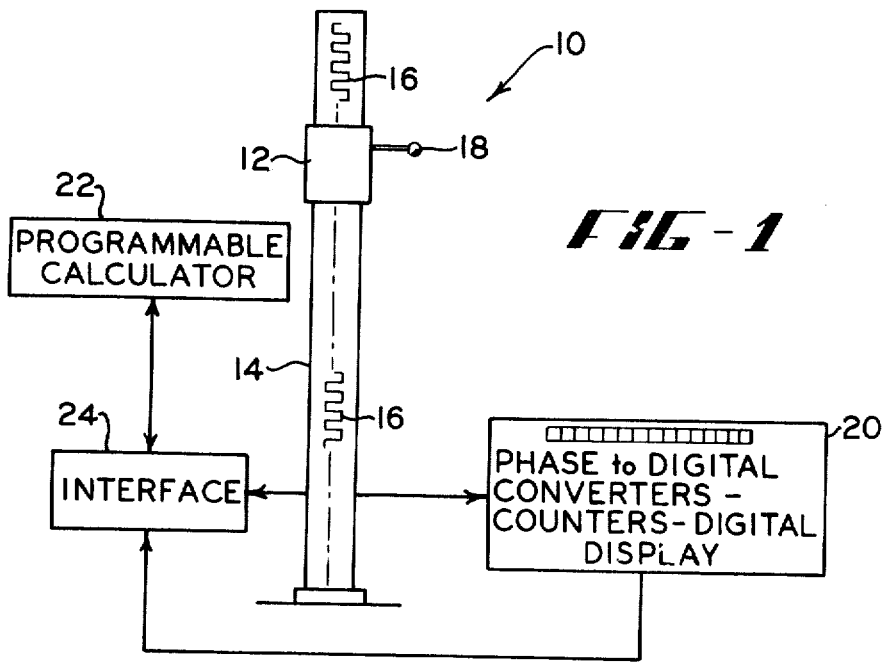
FIG. 1 is a schematic block diagram of the fundamental electro-mechanical structure of the invention.

Referring now to the drawings and more particularly FIG. 1, it can be seen that a digital height gauge system of the invention is designated generally by the numeral 10. Here it can be seen that the system 10 comprises four basic components, the first of which consists of an inductosyn-type scale 14, characterized by the presence of precisely space etched copper coils 16, having thereon a movable slider 12 which is characterized by the presence of a probe 18. An output from the slider 12, which is indicative of the change of positional relationship of the slider 12 upon the inductosyn scale 14, is sent to the element 20 which comprises a phase to digital converter, counters and a digital display system. The element 20 and the elements 12–18 just described are presented in precise detail in copending patent application Ser. No. 303,627 filed Nov. 3, 1972, now U.S. Pat. No. 3,851,329. Suffice it to say that movement of the slider 12 upon the inductosyn scale 14 results in the transfer of information to the element 20 where a visual display of the same may be seen. When the probe properly contacts a measurement surface, automatic or operator actuation of appropriate latching means freezes the counters at the value indicated upon such contact and the same is displayed and available for computational use. The element 20 is operative to reduce the sinusoidal outputs of the slider assembly 12 into binary coded decimal (BCD) equivalents for storage and display purposes.

It is further contemplated, as will be discussed hereinafter, that the slider and probe assembly 12,18 of FIG. 1 might readily be the bidirectional zero radius auto-fire probe and amplifier assembly as presented in copending patent application Ser. No. 369,874 filed June 14, 1973. Fundamentally, such a probe assembly is operative to automatically transfer data to the element 20 when the center of the probe 18 comes into contact with the measurement surface. Of course, it will be understood that the system 10 may readily utilize the dial indicator or null detect type of sliders which are well known in the art.

The element 20, containing BCD information relative to the positional relationship of the slider 12 upon the scale 14, is connected to an interface circuit 24 which is operative to transfer the data of the element 20 to a programmable calculator 22. While the programmable calculator 22 may be of any suitable nature or may indeed be a mini computer, the preferred embodiment of the invention teaches that the same is of the 1800 series manufactured by Monroe Calculators of Orange, New Jersey. Such calculators, as are well known in the art, are capable of receiving, storing, and operating upon data presented in a BCD form.

INTERFACE 24

As was mentioned hereinabove, each of the elements 12–22 as presented in FIG. 1 are clearly described in the above referenced U.S. Letters Patents or copending Patent Applications. The interface circuit 24 is operative to interconnect these referenced structures in such a manner as to present the entire system 10 in an operable cohesive form.

Figure 2:
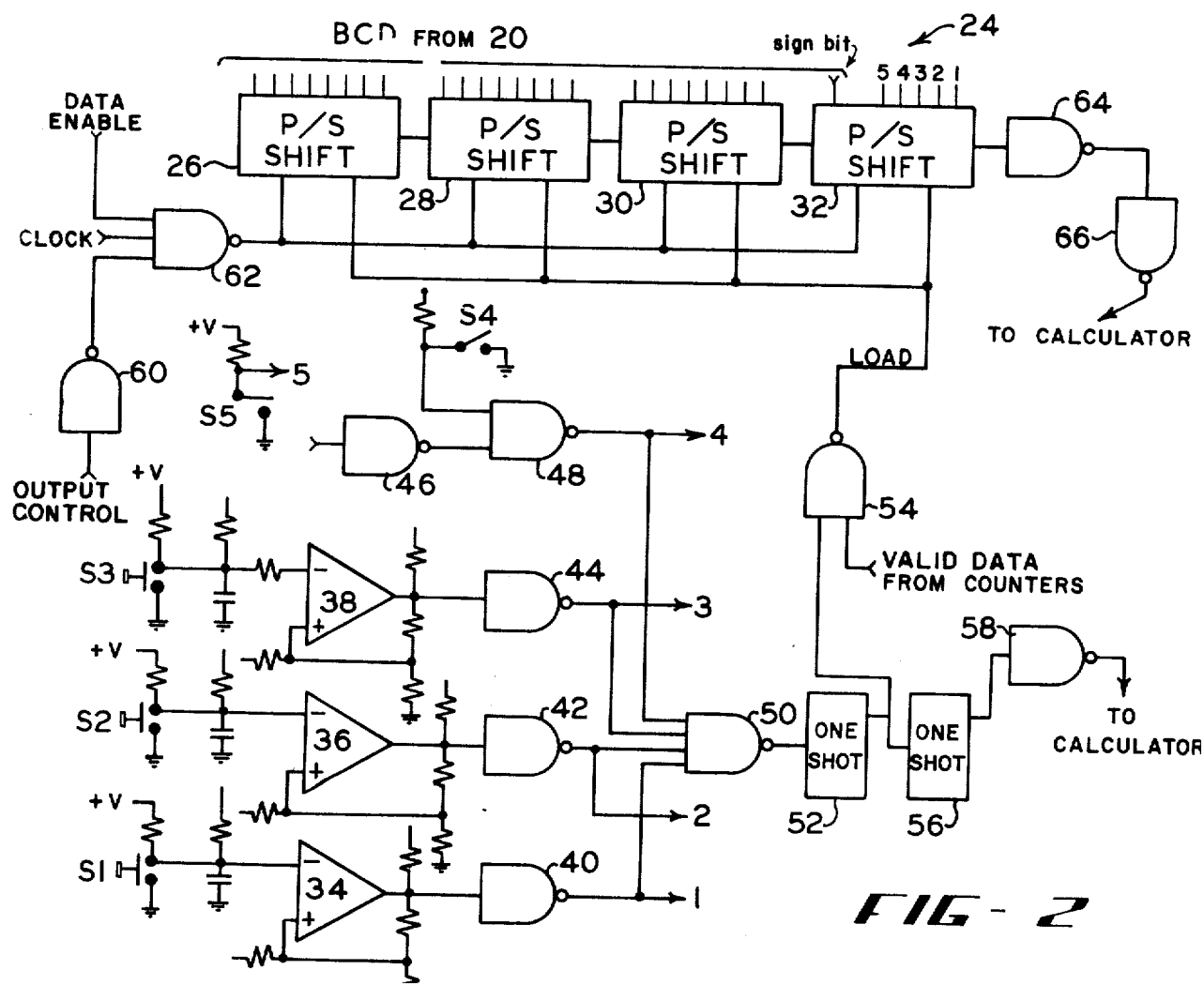
FIG. 2 is a schematic circuit diagram of the interface circuitry of the invention interconnecting the programmable calculator with the other elements thereof.

As can be seen in FIG. 2, a plurality of switches S1–S5 are associated with the vertical structure of the probe assembly 10 of FIG. 1 so as to control, through the interface 24, the various functions to be performed by the programmable calculator 22. As can be seen, the switches S1–S3 are connected to the inverting inputs of the operational amplifiers 34–38 respectively, the outputs of the amplifiers respectively feeding the NAND gates 40–44. Each of the operational amplifiers 34–38 has connected between the positive input and the output thereof a hysteresis circuit eliminating the detrimental effect of contace bounce caused by the actuation of the momentary switches S1–S3. It should be apparent that actuation of any of the switches S1–S3 causes a positive output from the associated operational amplifier and hence a negative output from the associated NAND gate.

As is described in the above referenced copending patent application Ser. No. 369,874, contact of a probe tip according to the teachings of the invention with a surface to be measured is operative to create a pulse. This pulse is applied to the input of a NAND gate 46 which feeds into the NAND gate 48. The toggle switch S4, associated with the auto-fire probe, may be manually actuated so as to enable the gate 48 to receive the signal from the probe tip. It should be readily apparent that the normal output of the NAND gate 48 will be at a logic one level as will the outputs of the gates 40–44 supplying inputs to the gate 50. Actuation of any of the momentary switches S1–S3 or the application of a pulse from the auto-fire probe to the gate 46 will thus result in a positive output from the NAND gate 50.

As can further be seen from FIG. 2, there is provided in association with the interface circuitry 24 a plurality of eight-bit parallel/serial shift registers 26–32. The parallel inputs of the shift registers 26–30 are the BCD outputs from the display 20 discussed above. Thus it can be seen that the three shift registers 26–30 provide the capability of receiving fixed digits of data from the display 20. The sign associated with the digits of the display 20 is supplied to an input of the register 32 as are the outputs 1–4 of the NAND gates 40, 42, 44 and 48. Thus there is supplied to the shift register 32 an indicia of the state of the switches S1–S4. There is also supplied as an input to the register 32 the output of a toggle switch S5 which will be discussed hereinafter.

The parallel inputs to the shift registers 26–32 discussed directly above are simultaneously loaded upon receipt of a load signal from the output of the NAND gate 54. As has been discussed, actuation of a switch S1–S3 or the auto-fire probe results in a high level output from the NAND gate 50. This output is passed to a one shot 52 which creates a positive going pulse which is in turn applied to an input of the NAND gate 54. Another input to the gate 54 is a signal from the counters 20 indicating that the counters are at a steady value and not in a changing condition so that a transfer of data therefrom may be achieved. The coincidence of the output of the one shot 52 and a VALID DATA signal from the counters 20 results in a LOAD signal from the gate 54 which is applied to the shift registers 26–32. The receipt of the LOAD signal results in the parallel loading of the data present on the inputs of the registers 26–32 as discussed above.

The trailing edge of the output of the one shot 52 triggers a second one shot 56 which applies a one millisecond pulse through the NAND gate 58 to the calculator 22. This pulse causes the calculator to come out of the idle loop in which it has been operating and initializes the same to receive data from the shift registers 26–32. In other words, as is well known in the art, the calculator is caused to enter into its data input routine.

The calculator 22 is a byte-oriented machine. Each byte comprises eight bits of data. There is a CLOCK associated with and created by the calculator 22 which controls the transfer of data. During the idle loop a DATA ENABLE and an OUTPUT CONTROL signal are created such that each is negative going for a period of time equivalent to eight clock pulses or in other words for the period of time required to transfer one byte of data. when the calculator 22 enters its data input routine, the DATA ENABLE signal is latched at a high level. This signal is applied to the NAND gate 62. The OUTPUT CONTROL signal from the calculator thus controls the transfer of data by applying, through the NAND gate 60, a positive going pulse to the NAND gate 62; the pulse being equivalent in duration to eight CLOCK pulses. Consequently, there is emitted from the gate 62 to the shift registers 26–32 eight CLOCK pulses for each output control signal from the calculator. These pulses control the shift registers so as to serially emit the data therefrom through the NAND gates 64, 66 to the data registers of the calculator. Since there are 32 bits of data associated with the shift registers, the calculator is programmed such that the data input routine will result in the retention of the DATA ENABLE signal at a high level for the duration of four OUTPUT CONTROL signals. Thus a total of 32 bits of data may be transferred.

The calculator has now received 25 bits of data relating to a fixed digit measurement and an associated sign and has also received data regarding the actuation or selection of the switches S1–S5. The calculator then proceeds into the program and sub programs as designated by the states of the switches. The programs selectable for the preferred embodiment of the invention are presented in flow chart form directly below.

AUTOMATIC DIGITAL HEIGHT GAUGE PROGRAM CAPABILITY

As was mentioned hereinabove, the preferred embodiment of the invention teaches the utilization of a Monroe Calculator 1800 Series Machine. It should of course be readily apparent that a mini computer or any of numerous other calculators could be interfaced with the system 10 in accordance with the teachings of the invention. by utilizing the Monroe Calculator designated, reference should be had to *Advanced Programming Reference Manual for Monroe 1800 Models* publication number 1664-s, published by Litton Business Systems, Inc. of Orange, New Jersey in 1973 and *Programming Reference Manual, Model 1800 Scientific Programmable Printing Calculator*, publication number 1653-s, published by Litton Business Systems, Inc. in 1972. These two manuals detail the programming technique required for the achievement of the objects of the invention.

Utilizing the general programming techniques associated with programmable digital calculators, the following functions may be performed by the system 10:

1. Probe Calibration

The diameter of the probe tip associated with the slider 2 may be automatically compensated for such that measurement may be made by coming down upon or up onto a surface. By compensating for the probe tip diameter, the effective measurement of an object is always made at the center of the probe rather than at the outside diameter thereof. Consequently, by allowing the calculator to compensate for the probe tip diameter, various sizes of probe tips or disks may be utilized with the system 10.

2. Slot, Hole or Pin Diameter Measurement

This is a two point measurement which allows the probe to sense both the inside and outside of a slot or hole and both sides of a pin so that the diameters thereof may be automatically determined by the difference between the two measurements.

3. Centerline Calculation

Upon determination of the diameter of a hole or the like, this sub routine provides for the determination of the centerline thereof and is operative to fix that centerline as a reference level from which other measurements may be made.

4. Inside and Outside Measurement

This sub routine provides for the addition or subtraction of the probe diameter to the measurements made depending upon whether the measurement is made for example on the inside of a hole or the outside diameter of a pin or disk.

5. English to Metric Conversion and Temperature Compensation

This sub routine provides for a multiplication factor such that calculations may be presented in both the English and metric system.

6. Presettable Sequence Numbers and Probe Direction Indicators

This sub routine provides for the automatic print out of sequencing numbers with each measurement made so that a layout drawing, having measurement sequence numbers thereon, may be followed in the gauging process and each measurement recorded will be readily capable of being referenced to the layout drawing. The probe direction indicators comprise an upward directed arrow if the measurement is made by bringing the probe up into contact with the surface, a downward directed arrow if the measurement is made with the probe coming down, and a double ended vertical arrow if the measurement was a two point measurement wherein the probe was first brought down upon a first surface and then up onto a second surface.

7. Shrink Factor Calculation

This routine is a simple multiplication similar to the English to metric conversion routine. By programming into the calculator the coefficient of thermal expansion related to the material of the object being gauged, a gauging process may be made upon a hot die and the measurements may be appropriately converted to the corresponding measurements which would be existent on a cool die.

8. Auto-Fire Point to Point Measurement

This program is utilized with the auto-fire probe discussed hereinabove. The point to point measurement characteristic indicates that the probe will receive and store a first measurement when the probe tip is first actuated and, upon a second actuation of the tip with a second surface, a calculation will be made based upon the two measurements taken.

9. Automatic Part Alignment

Often times an object to be gauged is not in exact alignment with the gauging system itself but may be skewed with respect to the vertical or horizontal axis. To correct for this problem, a sub routine is provided. Fundamentally, this sub routine requires the actual measurement and determination of two centerlines on the object being gauged. The interpositional relationships between these two centerlines is then compared with the nominal relationship which is known to exist between the two centerlines. The discrepancy between the measured and the actual alignment of the centerlines is then used to determine the misalignment of the object with respect to the measuring system. The program is then operable to apply the commonly known formulas associated with the translation and rotation of axis to correct for the misalignment in all measurements taken.

10. Automatic Centerline to Centerline ID

This program or sub routine provides for the automatic determination of the centerline of a hole, slot or the like by means of the measurement of a cord of the same. The probe of the system 10 may be placed within a hole and moved vertically upward and then downward to contact both an upper and lower surface thereof and the centerline of the hole is then automatically determined. There is no need for the determination of the diameter of the hole but this program automatically determines the centerline on the basis of a cord length. Obviously, this sub routine is good only for inside dimensions since an inside contact of an upper and lower point of a hole may be made without moving the horizontal position of the probe and thus losing the cord alignment.

11. Deviation from Nominal

This sub routine provides for the determination of the degree of variation of a particular measurement from the nominal measurement dictacted by the layout drawing. The nominal measurements are preloaded into the calculator and comparisons are appropriately made between the actual measurement and the nominal.

12. Comparison to Plus and Minus Tolerances

The plus and minus tolerances allowable for a given measurement are loaded into the calculator and the deviation from nominal is compared with these tolerances and an indication is made as to whether the deviation is within the allowable tolerance.

13. Entry of Nominal Measurements

This sub routine allows the operator to preload the registers of the calculator with the nominal measurements from the layout drawing. These nominal measurements may be loaded either by means of the keyboard or by means of a magnetic card as is well known in the art.

14. Listing of Stored Nominal Dimensions

With this routine the operator may cause the calculator to print out all of the listed nominal dimensions associated with the structure being gauged. The print out may be by means of paper tape or may be made via magnetic cards so that a permanent record may be maintained for the particular structure. The operator may load in the nominal dimensions by means of the keyboard and then have the dimensions transferred to the magnetic card for permanent and reuseable storage.

The above sub routines all comprise a portion of the fundamental program utilized in accordance with the teachings of the invention. All of these sub routines are readily devised by following the programming techniques associated with the calculator or mini computer of the system 10.

SYSTEM FLOW DIAGRAM

Figure 3:
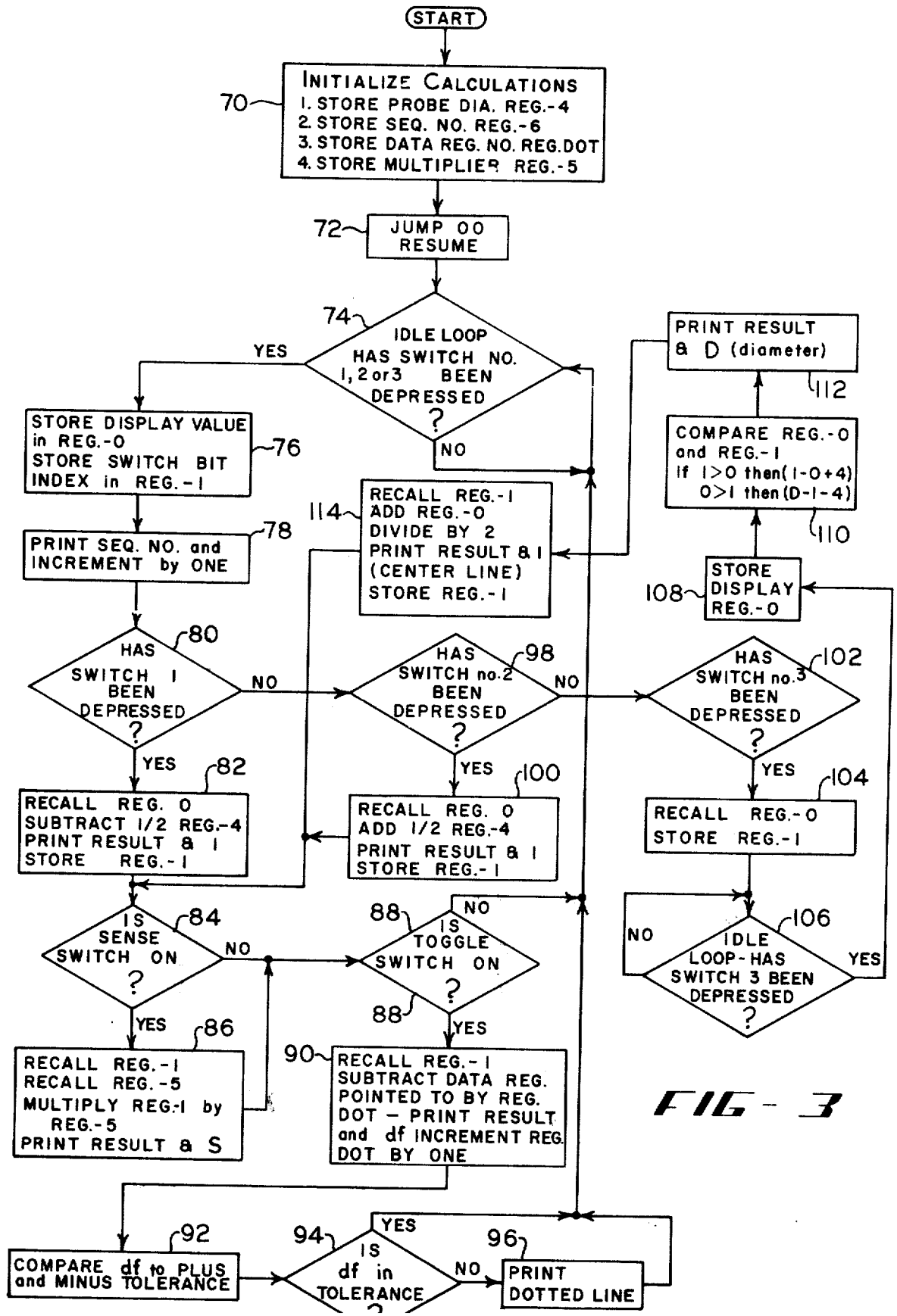
FIG. 3 is a flow chart illustrating some of the programmable capabilities of the system.

The fundamental program of the system 10 is presented in flow chart form in FIG. 3. Again, this flow chart is presented for illustrative purposes only and it is to be readily understood that, by the incorporation of the circuitry of FIG. 2, any of numerous types of programs might be implemented with the invention.

Of course, the START sequence of the flow chart comprises the loading of the program into the calculator by means of a magnetic card or other appropriate method. Once the calculator has been loaded and initialized, the probe diameter to be associated with the slider 12 is stored into register 4 of the calculator. The initial sequence number, which for most situations will be sequence number 1, is stored in register 6. As will be understood hereinafter, as each measurement is made the register 6, containing the sequence numbers, increments by 1.

The next fundamental step as indicated in the flow chart is the storage of a data register number into register DOT. The register number stored therein will be the first register containing the nominal dimensions of the various portions of the object to be measured. It should be readily understood that beginning with the register whose number is stored in register DOT, and proceeding sequentially therefrom each of the data registers of the system will contain the nominal dimensions associated with the sequential measurements to be made.

The last initialization step associated with the program of the system 10 is the storing of a multiplier into register 5. This multiplier may be the inch to metric multiplication factor or the thermal expansion coefficient as described hereinabove. After the initial loading of the various registers as shown in block 70 of FIG. 3, the calculator is sent into its idle loop by the depressing of the button JUMP OO and the button RESUME on the keyboard as indicated by block 72. This automatically jumps the calculator to the beginning of the program in register OO. The calculator will remain in the idle loop until an indication is made to the calculator through the circuitry of FIG. 2 that momentary switch S1, S2 or S3 has been actuated. Upon the actuation of any of the three mentioned momnetary switches, the calculator as indicated in block 76, stores the BCD data from the display 20 into register O. The data regarding the states of the switches is then stored into register 1; this information of course coming from the shift register 32 as discussed in regards to FIG. 2. A sequence number, which was that number initially stored in register 6 in block 70, is then printed and the value of register 6 is incremented by 1 to be prepared for the next pass through the flow chart.

The calculator then determines which of the switches, S1, S2 or S3 has been actuated. If switch S1 has been actuated then the data stored in register 0 from the display 20 is recalled and the radius of the probe tip, which is one half of the diameter as stored in register 4 in block 70, is substracted from the value in register 0. This result is then printed along with a downwardly directed arrow so as to indicate that the measurement was made by the movement of the probe tip down upon a surface, this being the case when switch S1 is actuated. As is indicated by block 82, the measurement is not only printed but also stored in register 1.

The determination is then made in decision block 84 as to whether or not a sense switch has been turned on. The sense switch is merely a toggle switch on the calculator keyboard which is programmed such that the actuation thereof causes the calculator to move to block 86 wherein the measurement stored in register 1 is recalled and multiplied by the multiplier stored in register 5 as per block 70. The product is then printed along with an indication showing that the printed result is a value compensated for either by an inch to metric conversion or by a temperature compensation factor.

If the sense switch is not actuated or after execution of the routine of 86, a determination is made at 88 as to whether the toggle switch S5 has been actuated. If S5 has been actuated then the measurement stored in register 1 is again recalled and substracted from the nominal dimension stored in register DOT as per block 70. The resultant difference is printed and indicated as being a difference. the register DOT is then incremented by 1 so as to be prepared for the next pass through the flow chart. From the calculations of block 90, the difference determined thereby is compared per block 92 to the plus and minus tolerances associated with the particular nominal value. If the measurement is within tolerance the functional step 94 causes the calculator to return to the idle loop 74. If the measurement is out of tolerance then the functional block 94 causes the calculator to print a dotted line under the measurement probe 96 indicating that an out of tolerance measurement has been made.

Reverting to decision block 80, it can be seen that if switch S1 has not been depressed then transfer is made to decision block 98. Here it can be seen that if momentary switch S2 has been actuated then the value stored in register 0 is added with the radius of the probe as presented by one half of the value stored in register 4 and the result is printed with an upward directed arrow indicating that the probe tip was brought up onto a surface. it should be readily apparent that switch S1 is to be actuated when the probe tip is brought down onto a surface and S2 is to be actuated when the same is brought up onto a surface. The manipulation directed by a logic box 100 terminates the specific executions indicated by switch S2 and the flow chart then passes to decision block 84 as discussed hereinabove.

If neither S1 or S2 has been actuated then the indication is made in decision box 102 that the switch S3 has been selected. The button S3 is depressed only when a two point measurement is to be made. A two point measurement is that which requires the ascertainment of positional relationship between two points such as diameter, length, width, depth or centerline measurement. Upon detection that switch S3 has been depressed, the value stored in register 0 is recalled and transferred to register 1. Upon completion of the data transfer as indicated by 104, the calculator enters the idle loop while the operator moves the slider 2 so as to bring the probe tip into contact with the second surface. When the second surface has been contacted the operator again depresses S3 and the calculator, through the decision block 106, causes the storage of the display again into register 0 per 108. A comparison is then made between the contents of registers 0 and 1 and the appropriate computation is made per 110 with the addition or subtraction of the probe diameter contained in register 4. The result is then printed and is indicated as being a diameter. It should be readily apparent that the diameter of the probe tip is added or subtracted depending upon whether an inside or outside diameter has been measured. The contents of registers 1 and 0 are then added together and divided by 2 with the result being printed, such result obviously being the centerline of the diameter calculated per 110. The centerline measurement is then stored in register 1 and the program proceeds to decision block 84 as discussed above.

It should now be readily apparent that the above described program functions to achieve the programmable objects of the invention. Again, any of numerous programs may be adapted for utilization by the system 10. While the above described program is adaptable for use with a dial indicator type probe, it is to be understood that the zero radius auto-fire probe described above would have a similar program associated therewith. Actuation of switches S1 or S2 would again indicate a single point measurement which would be immediately calculated upon actuation of the probe tip, the particular switch actuated, S1 or S2, indicating whether the measurement is made in an upward or downward direction. If neither switch S1 or S2 is actuated prior to the actuation of the auto-fire probe then the system would operate in the manner presented in regards to S3 of FIG. 3. Such a program should be readily conceived by one skilled in the art.

Thus it can be seen that the objects of the invention have been achieved by the apparatus and techniques presented hereinabove. While in accordance with the Patent Statutes only the best mode and preferred embodiment of the invention as contemplated by the inventor have been presented and described in detail, it is to be understood that the invention is not limited thereto or thereby. consequently, for an appreciation of the scope and breadth of the invention reference should be had to the accompanying claims.

What is claimed is:

1. a digital height gauge for measuring, calculating and recording the measurements between various points on an object to be gauged, comprising:
   probe assembly means for making contact with the various points producing sinusoidal signals indicative of the positional relationships therebetween;
   conversion means connected to the probe assembly means for receiving and converting the sinusoidal signals into binary signals;
   calculator means for performing preprogrammed operations for determining particular dimensions of the object from the binary signals; and
   interface means comprising a plurality of parallel/serial shift registers, interconnecting the conversion and calculator means for transferring binary data therebetween, said interface means further including a plurality of operator-actuatable switches, the actuation of any such switch creating signals to the calculator means, conversion means and parallel/serial shift registers to achieve the transfer of data from the conversion means to the calculator means.

2. A digital height gauge as recited in claim 1 wherein the probe assembly means comprises a signal-producing slider movably positioned upon an inductosyn type scale, such movement resulting in the creation of electrical signals indicating the positional change of the slider upon the scales.

3. The digital height gauge as recited in claim 2 wherein the conversion means comprises a phase angle to ditigal converter receiving the output of the probe assembly means and converting the same into a binary coded decimal form.

4. The digital height gauge as recited in claim 3 wherein the calculator means comprises a programmable ditigal calculator operative to receive data in a binary coded decimal form.

5. The digital height gauge as recited in claim 1 wherein the calculator means has binary coded decimal inputs, and the conversion means has binary coded decimal outputs connected to said inputs.

6. The digital height gauge as recited in claim 1 wherein at least three operator actuatable switches are provided, a first switch to be actuated when the probe assembly makes contact with a point in a downward direction, a second switch to be actuated when the probe assembly makes contact with a point in an upward direction, and a third switch to be actuated when a measurement is to be taken between two points, one contacted in an upward direction and the other contacted in a downward direction.

7. The digital height gauge as recited in claim 6 wherein the probe assembly means comprises an auto-fire probe creating a signal the actuation of which, immediately upon contact with a surface, creates signals to the calculator means, conversion means and parallel/serial shift registers to achieve the transfer of data from the conversion means to the calculator means.

8. An interface circuit for controlling the transfer of data from data sources containing parallel binary data bits to a programmable calculator, the calculator creating clock signals for timing the transfer of data thereto, comprising:
   parallel/serial shift registers having the inputs thereof connected to the data sources and the outputs thereof to the calculator; and
   circuit means interconnecting the data sources, calculator, and parallel/serial shift registers for producing a signal loading the shift registers and enabling the application of the clock pulses to the shift registers to achieve the serial transfer of data therefrom, said circuit means including a plurality of operator-actuatable switches operatively connected to a first monostable multivibrator, actuation of any one of the switches creating a single load pulse from the multivibrator to the parallel/serial shift registers for the loading of the same.

9. The interface circuit as recited in claim 8 wherein a second monostable multivibrator is triggered by the trailing edge of the output of the first monostable multivibrator and is operative to send a signal to the calculator to initialize the same for receipt of data.

* * * * *